Patented Nov. 9, 1948

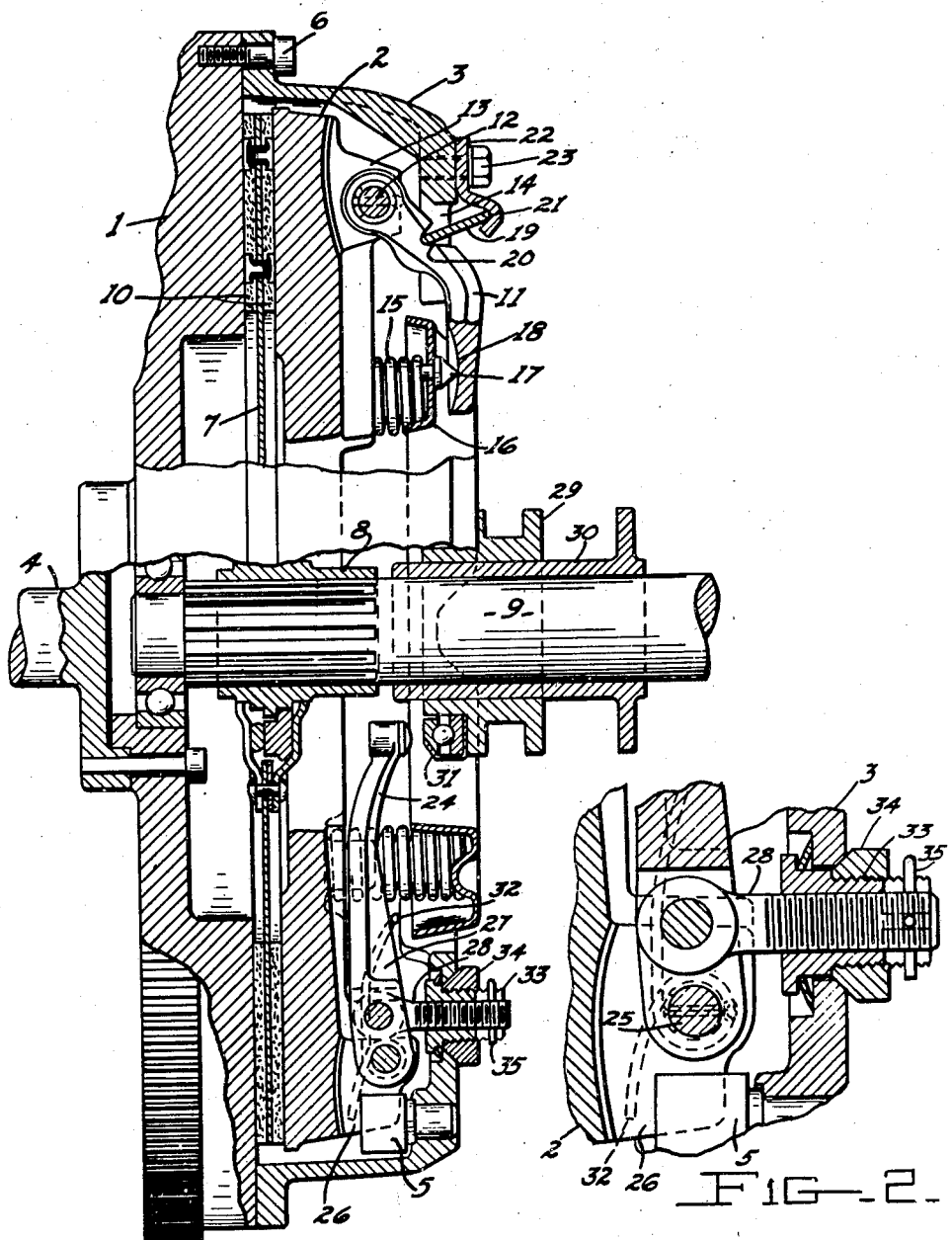

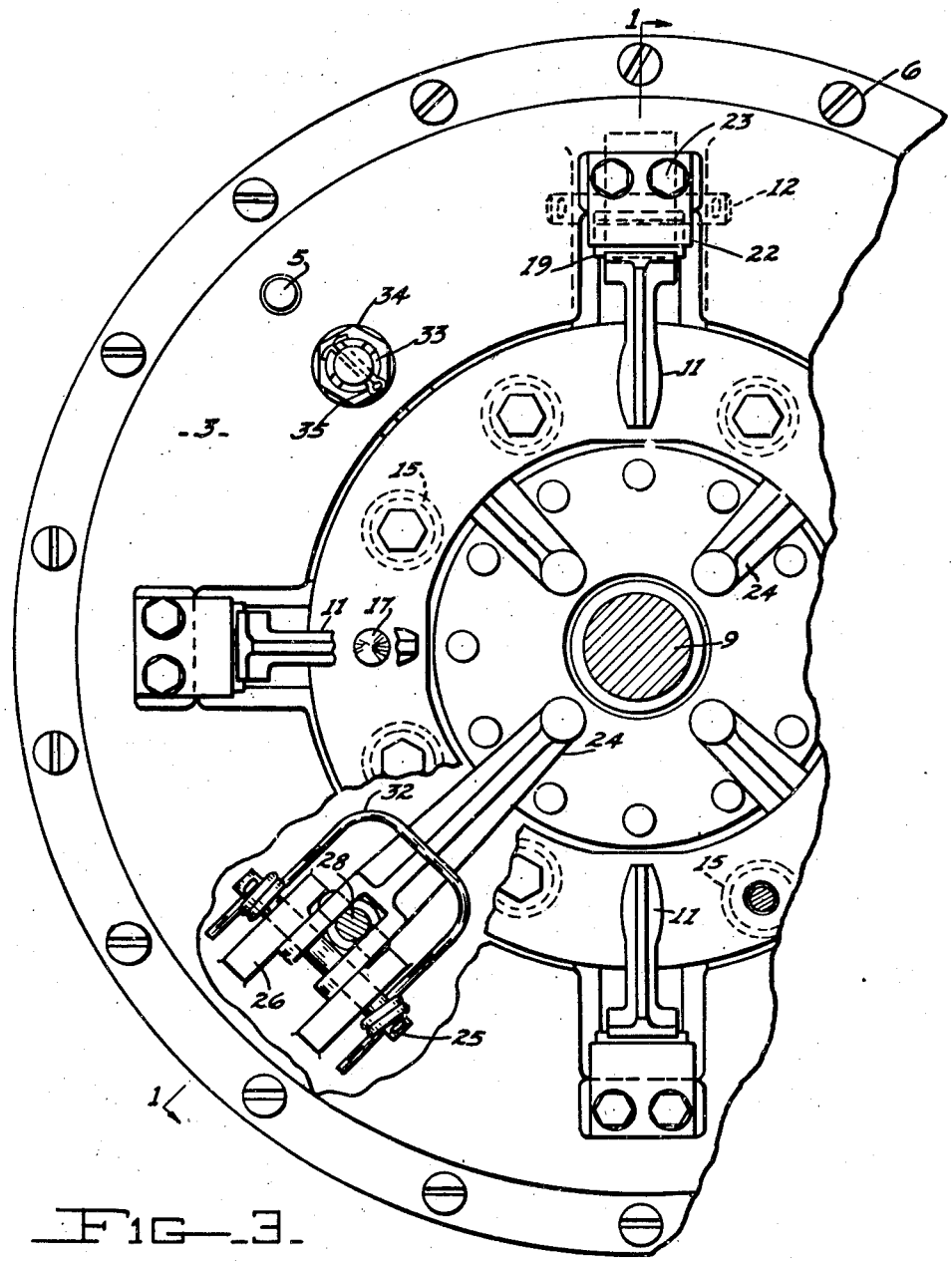

2,453,344

UNITED STATES PATENT OFFICE 2,453,344

FRICTION CLUTCH OPERATING MECHANISM

Robert S. Root, Syracuse, N. Y., assignor to Lipe-Rollway Corporation, Syracuse, N. Y., a corporation of New York Application June 19, 1947, Serial No. 755,701

4 Claims. (Cl. 192—99)

This invention relates to automotive friction clutches of the type including spring actuated clutch engaging levers so arranged that the clutch spring effort applied to the pressure ring is multiplied through the levers, and also including throw-out levers of greater leverage than the clutch engaging levers, whereby the clutch is disengaged against the spring actuated clutch engaging levers without appreciable additional effort on the part of the operator or, in other words, whereby comparatively heavily loaded clutch engaging springs can be operated to disengage the clutch through the higher leverage ratio without appreciably adding to the effort of the operator.

It has for its object a particularly compact arrangement of the clutch engaging levers and the throw-out levers without increasing the overall axial length of the clutch.

More specifically, it has for its object an arrangement of the clutch engaging levers and the clutch throw-out levers in the type of clutch which includes a driving member including a body or fly wheel, an axially shiftable pressure plate, and a back plate, and the driven member includes a friction plate extending between the body and the pressure ring, with the clutch engaging levers extending radially and pivoted at their outer ends to the pressure ring and extending rearwardly and downwardly through the back plate to the rear thereof with spring means acting on the inner ends of the levers, and the throw-out levers of greater leverage ratio are located in a plane between the pressure ring and the inner ends of the engaging levers to which the spring pressure is applied.

It further has for its object a particularly simple, readily assemblable clutch engaging lever means including a toggle or fulcrum link for the levers.

The invention consists in the novel features and in the combinations and constructions hereinafter set forth and claimed.

In describing this invention, reference is had to the accompanying drawings in which like characters designate corresponding parts in all the views.

Figure 1 is a sectional view, partly broken away and partly in elevation, taken approximately on line 1—1, Figure 3.

Figure 2 is an enlarged fragmentary sectional view of parts seen in Figure 1.

Figure 3 is a fragmentary rear elevation, partly in section, looking to the left in Figure 1.

The driving member of the clutch includes generally a body 1 which is usually the fly wheel of an engine, a pressure ring 2, and a back plate 3. The body 1 is mounted on the crank shaft 4 of an engine in any suitable manner. The pressure ring 2 is mounted to rotate with the fly wheel 1, or the back plate 3, and is connected thereto through driving lugs 5. The back plate 3 is here shown in the form of a cowl or housing in cross section and is secured to the body 1 in any suitable manner, as by screws 6. The driven member 7 has a hub 8 slidably splined on the clutch shaft 9. The driven member or plate 7 extends between the pressure ring 2 and the body 1, and is provided with friction facings 10 on opposite sides thereof.

The spring loaded clutch engaging levers 11 are pivoted at 12 at their outer ends between lugs 13 on the outer or rear side of the pressure ring 2 and extend rearwardly and radially inwardly toward the axis of rotation of the clutch through radial slots 14 in the back plate. The levers are spring actuated by an annular series of springs 15 interposed between the pressure ring 2 and an annular spring abutment 16, which abutment has thrust points 17 at intervals thrusting at 18 against the inner ends of the levers 11. The springs are arranged on opposite sides of the inner ends of the levers 11. The levers 11 are fulcrumed to thrust links 19, each of which is seated in an open seat or notch 20 formed in the adjacent lever between its ends and also in an open seat or notch 21 in a thrust plate or part 22 secured, as by screws 23, to the back plate. The fulcrums also extend through the slots 14 in the back plate. These fulcrums 19 and the arms of the levers between the fulcrums and the pivots 12 form normally folded toggles which move toward a straight line to engage the clutch under the urge of the springs 15. Owing to the fact that these fulcrums or toggle links 19 are held at their ends in notches or open sockets, the toggle construction is particularly easy to assemble without using pivots or toggle joints. Also, owing to the slots 14, the toggle links or plates 19 are held from lateral displacement. Owing to the thrust parts or plates 22, the parts of the lever mechanism, particularly the toggle thereof, can be readily and accurately assembled and removed.

The throw-out levers 24 are pivoted at 25 at their outer ends between rearwardly extending lugs 26 on the pressure ring 2, are extended radially inward, and are fulcrumed at 27 near their outer ends to fulcrums 28 carried by the back plate. These levers 24 are of greater length in a radial direction than the levers 11 and hence, have a greater leverage ratio than the levers 11. They are operated by an axially movable throw-out collar 29 slidable on a sleeve 30 on the clutch shaft 9, the force of the throw-out collar being transferred to the inner ends of the levers through an antifriction bearing 31. The inner ends of the levers are held spaced from the throw-out bearing by a suitable spring 32 acting on each lever and biased to press the lever 24, as to the left in Figure 1. This spring may be of any suitable construction. Each fulcrum 28 extends between the bifurcated outer end of each lever 24. The fulcrum is formed with a threaded stem screwing through an externally threaded sleeve 33 which extends through the back plate and has a clamping nut 34 threading thereon against the back plate. The sleeve is held from relative turning by a lock key 35. To adjust the fulcrum 28, the key 35 is removed, the nut 34 turned, moving the fulcrum axially, and the key replaced when the desired axial adjustment of the fulcrum is obtained.

The levers 24 are arranged between the pressure ring 2 and the annular abutment 16 and hence, the throw-out collar 29 can be located a comparatively short axial distance from the plane of the pressure ring and also can extend axially inward beyond the inner ends of the clutch engaging levers 11. This results in a compact construction in an axial direction.

What I claim is:

1. An engaging and release mechanism for clutches of the type including driving and driven members in which the driving member includes a body, an axially movable pressure ring and a back plate, and the driven member includes a plate extending between the body and the pressure ring, said mechanism including a lever pivoted to the pressure ring on the outer rear side thereof and extending radially inward therefrom, loaded spring means thrusting in opposite directions against the pressure ring and the inner end portion of the lever, and a fulcrum member for the lever, the lever being formed with an open socket between its ends on the rear side thereof for one end of the fulcrum member, and the back plate being provided with means formed with an open socket for receiving the other end of the fulcrum member, the fulcrum member and the lever forming a normally folded toggle movable toward a straight line under the influence of the spring means to engage the clutch.

2. An engaging and release mechanism for clutches of the type including driving and driven members in which the driving member includes a body, an axially movable pressure ring and a back plate, and the driven member includes a plate extending between the body and the pressure ring, said mechanism including a lever pivoted to the pressure ring on the outer rear side thereof and extending radially inward therefrom, loaded spring means thrusting in opposite directions against the pressure ring and the inner end portion of the lever, and a fulcrum member for the lever, the lever being formed with an open socket between its ends on the rear side thereof for one end of the fulcrum member, and the back plate being provided with means formed with an open socket for receiving the other end of the fulcrum member, the fulcrum member and the lever forming a normally folded toggle movable toward a straight line under the influence of the spring means to engage the clutch, the back plate being formed with a radial slot through which the fulcrum member extends, the walls of the slot holding the fulcrum member from lateral displacement out of the sockets.

3. An engaging and release mechanism for clutches of the type including driving and driven members in which the driving member includes a body, an axially movable pressure ring and a back plate, and the driven member includes a plate extending between the body and the pressure ring, said mechanism including lever means coacting with the pressure ring and spring means acting on the lever means to transmit and multiply the force of the spring means to the pressure ring, and radially extending throw-out levers of greater leverage ratio than that of the former levers and connected to the pressure ring at their outer ends, and to the back plate by fulcrum means rigid with the back plate and located near the outer ends of the throw-out levers and operable to disengage the clutch against the spring actuated clutch engaging levers.

4. An engaging and release mechanism for clutches of the type including driving and driven members in which the driving member includes a body, an axially movable pressure ring and a back plate, and the driven member includes a plate extending between the body and the pressure ring, said mechanism including levers pivoted to the pressure ring on the outer rear side thereof and extending rearwardly and radially inward from the pressure ring, spring means interposed between the levers and the pressure ring, fulcrum members for the levers located between the levers and thrust parts provided on the outer side of the back plate, the back plate being formed with radial slots through which the levers and the fulcrum members extend, and throw-out levers of greater leverage ratio than the former levers and connected to the pressure ring at their outer ends and fulcrumed to the back plate by fulcrum means near their outer ends, the throw-out levers being located in a plane between the pressure ring and the inner ends of the clutch engaging levers.

ROBERT S. ROOT.

No references cited.